Oct. 27, 1959   G. A. BOUVIER   2,909,944
LOW SPEED ACTUATOR
Filed June 29, 1956   3 Sheets-Sheet 1

INVENTOR.
GEORGE A. BOUVIER
BY
William R. Lum
ATTORNEY

Oct. 27, 1959     G. A. BOUVIER     2,909,944
LOW SPEED ACTUATOR

Filed June 29, 1956     3 Sheets-Sheet 3

*INVENTOR.*
GEORGE A. BOUVIER
BY William R. Lane
ATTORNEY

United States Patent Office 2,909,944
Patented Oct. 27, 1959

2,909,944

LOW SPEED ACTUATOR

George A. Bouvier, Sierra Madre, Calif., assignor to North American Aviation, Inc.

Application June 29, 1956, Serial No. 594,737

16 Claims. (Cl. 74—800)

This invention relates to a speed reducer and low speed actuator.

The present invention is a modification of the speed reducer disclosed in my co-pending application, Serial No. 585,443, filed May 17, 1956 for use where still greater reduction of speed is desired.

It is an object of the invention to provide an improved, precise, durable and compact speed reducer with relatively few moving parts and construction in units which are small and light in relation to power transmitted.

It is a further object to obtain a still greater reduction of speed while retaining the advantages of avoiding backlash effects and preventing "wind-up" effects as well as maintaining static friction at a minimum and substantially avoiding inertia effects.

A further object is to provide a unique arrangement for cascading the speed reduction effect accomplished in the wobble gear type of speed reducer described in the co-pending application.

In carrying out the invention in accordance with a preferred form thereof, concentric anchor and terminal gears are provided with rows of teeth facing substantially the same direction and a wobble gear is provided with concentric rows of teeth facing toward the teeth of the anchor gear and the terminal gear. These alone would provide the speed reduction effect accomplished in my aforesaid co-pending application. For still greater speed reduction with relatively little increase in weight or number of parts, one or more pairs of floating gears are interposed between the facing teeth of the wobble gear and the anchor and terminal gears. Each gear in each pair of floating gears is in the form of a ring having opposite faces, each with a row of teeth thereon arranged for meshing with an axially adjacent row of teeth. The axially adjacent row of teeth may be one of the rows of teeth of the wobble gear, or the anchor gear, the terminal gear, or of another floating gear. Suitable means are provided for radially retaining the floating gears while providing freedom of motion with respect to both rotation and tilting in order that the wobble gear may be caused to nutate, with the teeth of both rows of the wobble gear in mesh with teeth of the floating gears, and with the remaining rows of teeth, in turn, in mesh with adjacent rows of teeth of an axially adjacent gear. Thus, at all times a complete connection is provided through successive gears from the anchor gear to the terminal gear.

A better understanding of the invention will be afforded by the following detailed description considered in conjunction with the accompanying drawing in which Fig. 1 is a longitudinal sectional view of a nutation gear actuator constituting an embodiment of the invention;

Figure 7:
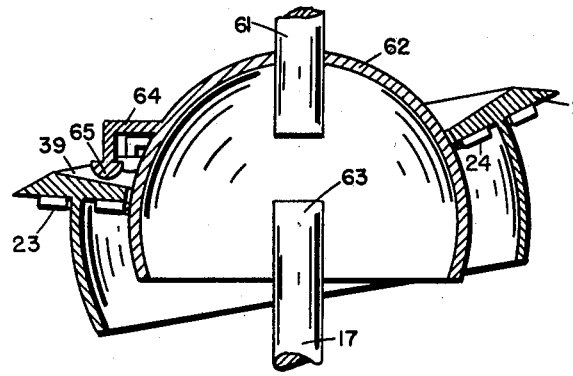

And Fig. 7 is a fragmentary longitudinal sectional view of an arrangement employing mechanical means for causing nutation of the wobble gear.

In the form of the apparatus shown schematically there is a housing 11 having an end plate 12 to which is secured an anchor gear 13 having a face lying along the frustum of a shallow conical surface carrying a row of teeth 14. There is a terminal gear 15 having a row of teeth 16 preferably lying along the same conical surface. The terminal gear 15 is carried by a rotatable shaft 17 serving as the output shaft of the apparatus and mounted in suitable bearings 18.

A wobble gear 21 is provided preferably having a face 22 which also lies along the frustum of a relatively shallow cone with two concentric rows of teeth 23 and 24 thereon. Suitable means hereinafter described are provided for retaining the wobble gear 21 radially while permitting both rotary and tilting motion. The arrangement is such that the row of teeth 23 might mesh with the row of anchor teeth 14 and the row of teeth 24 might mesh with the row of teeth 16 of the terminal gear 15 if sufficient tilting motion were permitted so that the arrangement would correspond to that described in the aforesaid pending application. However, in order to effect a further great reduction of speed of the output shaft 17, without significantly adding to the inertia effect and with relatively few additional parts, floating gear means comprising one or more pairs of floating gears are interposed. For simplicity in the drawing, only one pair of floating gears is shown, comprising an outer floating gear 25 and an inner floating gear 26.

In the embodiment illustrated, each floating gear comprises a ring with opposite faces which are toothed to mesh with teeth of axially adjacent gears. As shown, the outer ring gear 25 has a row of teeth 27 on one face, referred to for the sake of reference, as the front face, and a second row of teeth 28 on the other face, referred to for the sake of reference, as the back face. Likewise, the inner floating gear 26 has rows of teeth 29 and 30 on opposite faces, referred to for the sake of reference, as the front and back faces, respectively. As shown, the row of anchor teeth 14 is adapted to mesh with the row of floating gear teeth 27. The row of floating gear teeth 28 is, in turn, arranged to mesh with the row of wobble gear teeth 23. The row of wobble gear teeth 24 is arranged to mesh with the row of floating gear teeth 30 and the row of floating gear teeth 29 is arranged to mesh with the row of terminal gear teeth 16.

A driving mechanism or actuator 31, shown schematically in the drawing, is provided for causing the wobble gear 21 to nutate and to press the rows of teeth 23 and 24 at some part of the periphery against the rows of teeth of the adjacent gear pressing the adjacent gear or gears in turn against the next adjacent gear so that, at some portion of the periphery, the floating gear teeth 29 mesh with the terminal gear teeth 16 and the floating gear teeth 27 mesh with the anchor gear teeth 14. It is to be understood that if additional pairs of floating gears were interposed the same action would take place with the teeth of adjacent faces of successive floating gears pressed into engagement axially at same portion of the periphery thereof. The wobble gear 21, together with the floating gears 25 and 26, constitute a suspended gear assembly of great simplicity, requiring no shafts or keyways, nor other mechanical connecting means other than tooth meshing.

Suitable means are provided for constantly pressing some portion of the periphery of the wobble gear 21 against floating gears 25 and 26 thereby also constantly engaging gear teeth on the anchor gear 13 and terminal gear 15 with respective teeth on the floating gears 25 and 26. Such means may be one of those described in my co-pending application. The wobble gear 21 may, for example, be radially permanently magnetized with the element 31 constituting means for producing a rotating magnetic field progressively acting upon the gear 21 around the periphery thereof for producing nutation of the wobble gear 21 and pressing the gear teeth into engagement. The element 31 may take the form of a conventional laminated steel toothed core upon which is wound a conventional polyphase alternating-current winding. Such structure is fully described in my co-pending application. Other means for producing nutation of the wobble gear and engagement of the gear teeth are hereinafter described.

In the embodiment illustrated in the drawing, the means for retaining the wobble gear 21 radially and giving it freedom of motion with respect to tilting and nutation, as well as rotation, comprises a spherical segment 32 secured to the housing 11 and having a center 33 constituting the center around which the wobble gear 21 is caused to nutate. The length of the element of the conical surface along which the wobble gear 21 lies, measured from the apex 33, to the inner edge 34 of the wobble gear 21 is made sufficiently greater than the radius of the outer surface of the spherical segment 32 to provide adequate clearance and a loose fit of the wobble gear 21 on the spherical segment 32. The inner diameter of the ring constituting the inner floating gear 26 is likewise sufficiently greater than the radius of the spherical segment 32 to permit adequate freedom of motion of the floating gear 26. As previously described, the wobble gear 21 is retained on the spherical segment 32 when the element 31 is energized by being pressed into engagement with teeth on the floating gears. Housing 11 is suitably formed so as to secure the wobble gear 32 between the floating gears and the element 31 when the element 31 is unenergized.

For radially retaining the outer floating gear or gears 25, a second spherical segment 35 is provided which is secured to the toothed face of the wobble gear 21 with radial dimensions such as to provide adequate clearance between the outer surface of the ring constituting the floating gear 26 and the inner surface of the ring constituting the floating gear 25.

The invention is not limited to the use of any specific numerical values or number of teeth on the gears, nor to using only one pair of floating gears. However, it has been found that the gear reduction in the ratio of one to one hundred million is accomplished by using only one pair of floating gears and with the number of teeth on the various gears, as indicated in the following table.

*Gear teeth identification*

| Reference numeral identifying rows of teeth | 14 | 27 | 28 | 23 | 24 | 30 | 29 | 16 |
|---|---|---|---|---|---|---|---|---|
| Number of teeth | 99 | 100 | 101 | 100 | 73 | 100 | 137 | 100 |

$$\text{Ratio} = 1 - \left(\frac{99}{100} \times \frac{101}{100} \times \frac{73}{100} \times \frac{137}{100}\right) = \frac{1}{100{,}000{,}000}$$

Figure 1:
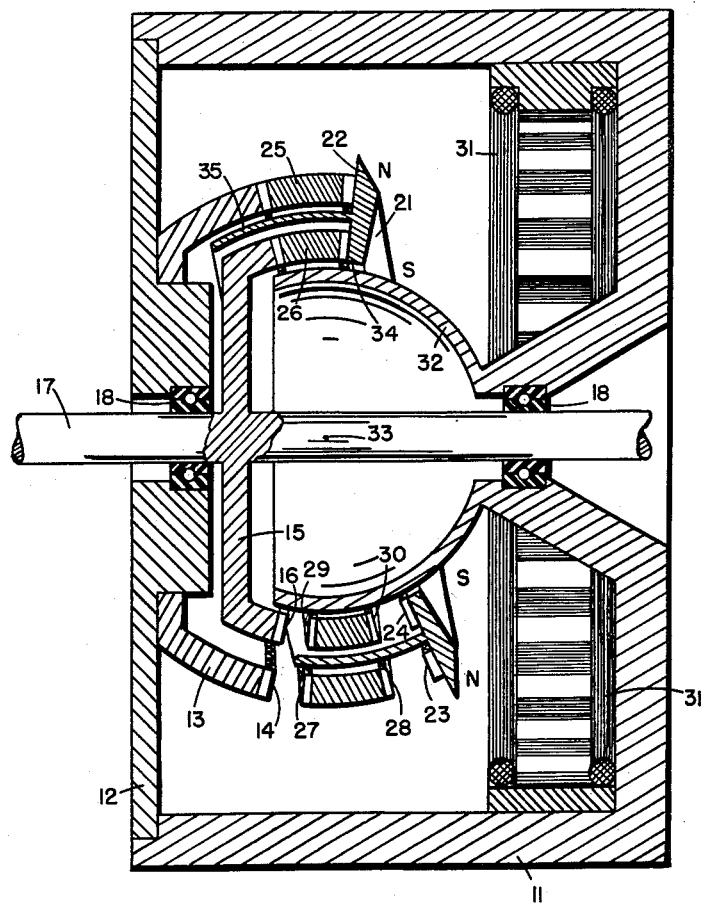
Figure 2:
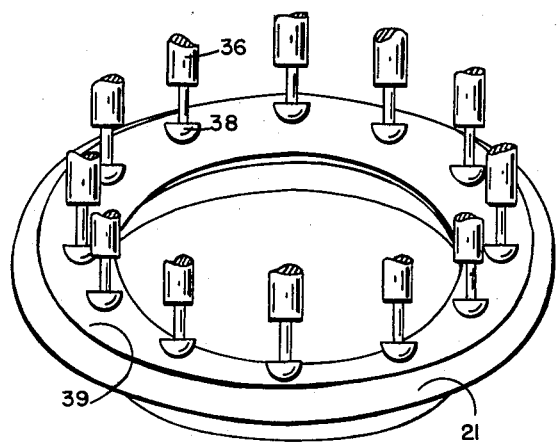
Fig. 2 is a fragmentary perspective view of a modification in the arrangement of Fig. 3 in which plungers are employed for causing nutation of the wobble gear.
Figure 3:
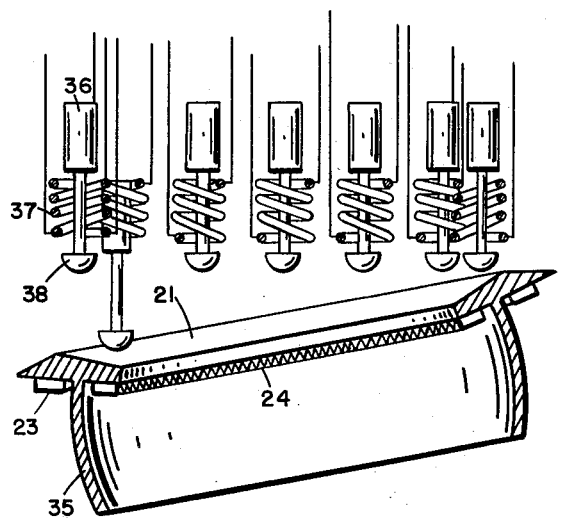
Fig. 3 is a fragmentary view partially in section of the embodiment represented in Fig. 2.

In Fig. 1 a polyphase type of electromagnetic field cooperating with a radially magnetized wobble gear is shown by way of illustration for causing nutation of the wobble gear. However, the invention is not limited thereto and does not exclude the use of progressively acting plungers or rotating mechanical means for effecting nutation. For example, as illustrated in Figs. 2 and 3, a plurality of plungers 36 may be provided which are mounted around the periphery of a circle having a radius approximately equal to the average radius of the ring-type wobble gear 21 with their axes parallel to the axis of the housing 11 and the output shaft 17. Solenoid windings 37 are provided for causing axial motion of the plungers 36 either one at a time or in pairs. Plungers 36 are preferably provided with tips 38 of durable low friction material, such as a copolymer or hexamethylene-diamine and adipic acid, sold under the trade name of nylon by E. I. duDont de Nemours & Co., for bearing against the back or smooth face 39 of the wobble gear 21.

Figure 4:
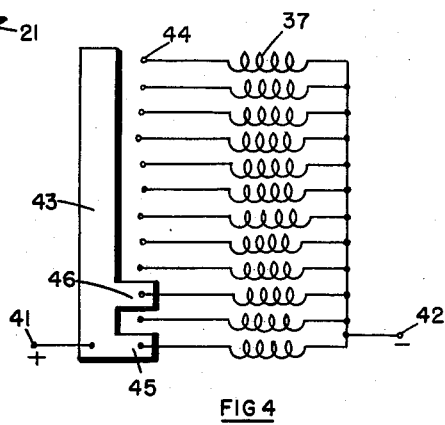
Fig. 4 is a schematic circuit diagram of a solenoid arrangement of the embodiment of Figs. 2 and 3, showing a developed few of the commutator employed.

For energizing the solenoids 37 from a source of direct current having terminals 41 and 42, a commutator may be provided as illustrated in Fig. 4. All of the solenoids 37 may be connected to one of the terminals constituting a common or neutral terminal, e.g., negative terminal 42. The opposite end of each solenoid 37 is connected to a separate one of a plurality of contacts or fingers 44 which cooperate with the commutator 43. For energizing the solenoids 37 one at a time, the commutator 43 may be provided with a lung 45 adapted to slide under the fingers 44 in succession. However, for increasing the stability of the wobble gear 21, as it is being tilted, preferably the solenoids 37 in the arrangement of Fig. 4, are energized in pairs. If a relatively large number of solenoids 37 are provided, as in Fig. 4, for example 12, a second commutator lug 46 may be provided which is spaced sufficiently far from the commutator lug 45 so that alternate solenoids instead of adjacent solenoids are energized at any given instant. The energization of alternate solenoids is illustrated in Fig. 3.

Figure 5:
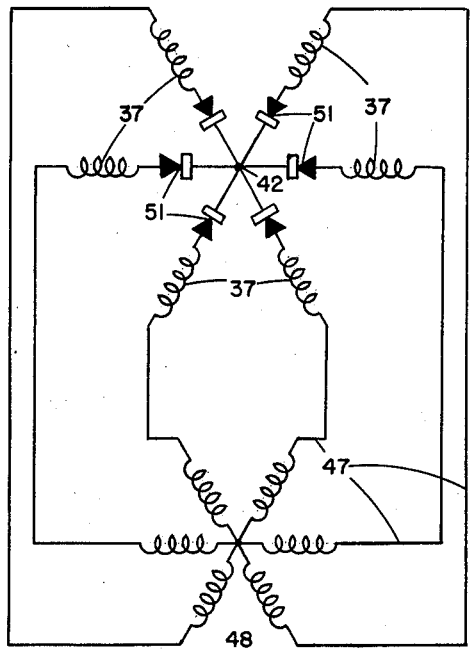
Fig. 5 is a circuit diagram of a modified solenoid connection arrangement.
Figure 5:
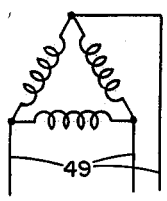

The invention is not limited to the use of direct current, however, nor to the use of a commutator for effecting progressive energization of the solenoid windings 37. For example, as illustrated in Fig. 5, the solenoids 37 may be connected to a source of six-phase current where there are six solenoids 37, all of the solenoids having a connection at one end to a neutral terminal 42 and at the other end to one of the terminals 47 of the secondary winding of the three-to-six phase transformer 48, energized a three-phase source 49. Rectifiers 51 are provided, each interposed in one of the connections of the windings 37 so that direct-current solenoids may be employed. For the sake of simplicity, in Fig. 5, a transformer 48 with a six-phase secondary has been provided, but it will be understood that the same arrangement may be employed for a greater number of solenoids. For example, for twelve solenoids a transformer system converting to twelve phases of the type well-known to those skilled in the art would be employed.

Figure 6:
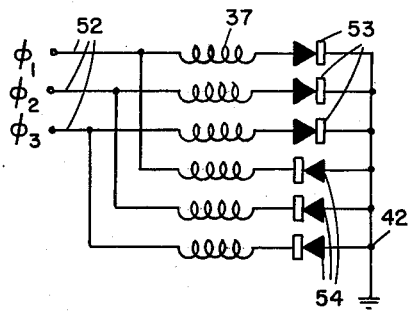
Fig. 6 is a circuit diagram of another type of connection.

In order to reduce the number of secondary windings required or in some case to avoid the necessity for a transformer reversed rectifiers may be employed as illustrated in Fig. 6. This gives the effect of double the number of phases of the alternating-current source. As illustrated in Fig. 6, a three-phase source of current 52 is provided for energizing six solenoids 37. Two solenoids are connected to each of the three phases 52 at one end and at the opposite end all of the solenoids are connected to a common neutral terminal 42, which may be grounded. The solenoids 37, as spaced around the periphery of the circle are connected to successive phases of the source 52, each solenoid having a rectifier in one of the connections. Solenoids 37 are divided into two groups, with one group having rectifiers 53 connected with one polarity with respect to the neutral terminal 42 and a second group connected to a series of rectifiers 54 having opposite polarity with respect to the neutral terminal 42. Thus, for each pair of solenoids connected to the same phase one solenoid has its rectifier connected with one polarity and the other solenoid mounted 180° therefrom has its rectifier connected with the opposite polarity.

A mechanical arrangement for producing nutation of the wobble gear 21 in response to rotation of the input shaft 61, is illustrated in Fig. 7. In this case, the stationary spherical retaining segment 32 of Fig. 1 is replaced by a rotatable segment 62 of like shape and size secured to an input shaft 61. The output shaft 17 is provided with a bearing (not shown) corresponding to bearing 18 of Fig. 1, which is of sufficient stability to permit cutting off the inner end 63 of the shaft 17. The rotating spherical-surface element 62 carries an arm 64 to which is secured a shoe 65 preferably provided with a surface of high durability and relatively low friction, such as a copolymer of hexamethylene-diamine and adipic acid. The parts are so arranged that, as the shaft 61 and the spherical member 62 rotate, the shoe 65 bears axially against successive portions of the back face 39 of the wobble gear 21 causing nutation thereof. Owing to the fact that the wobble gear 21 has its faces lying substantially along the surfaces of flat cones, when one portion of the wobble gear is pressed against the floating gears 25 and 26, the remaining portions are caused to be lifted away and nutation therefore results from the rotation of the shoe 65.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A speed reducer comprising in combination an anchor gear with a row of teeth thereon, a floating gear having opposite faces with first and second rows of teeth thereon, the first row of teeth being arranged to mesh with the anchor gear, a wobble gear mounted with an axis capable of tilting and with first and second concentric rows of teeth thereon, the first row being arranged to mesh with the second row of teeth of the floating gear, mechanism for effecting nutation of the wobble gear, a second floating gear having opposite faces with first and second rows of teeth thereon, respectively, the first row of teeth of the second floating gear being arranged to mesh with the teeth of the second row of the wobble gear, and a terminal gear having teeth arranged to mesh with the second row of teeth of the second floating gear, at least one of the rows of teeth of the wobble gear differing in number by at least one from the number of teeth of the gear meshing therewith.

2. A speed reducer as in claim 1 wherein the floating gears constitute rings of different diameter with toothed faces, and the wobble gear has a spherical segment secured thereto for radially spacing the floating gears and radially retaining them with freedom of both tilting and rotating motion.

3. A speed reducer as in claim 1 wherein the wobble gear is formed with a surface constituting a relatively flat truncated cone and a stationary spherical segment is provided having a radius fitting within said truncated cone shape wobble gear for retaining the wobble gear radially while permitting it freedom of motion with respect to tilting and rotation.

4. A speed reducer comprising in combination an anchor gear with a row of teeth thereon, a rotatable terminal gear of different diameter from the anchor gear with a row of teeth thereon and so mounted that the rows of teeth of the two gears face in substantially the same direction and one row lies substantially within the other row, a wobble gear mounted with an axis capable of tilting, and with first and second concentric rows of teeth facing toward the teeth of the anchor gear and the terminal gear, and a plurality of adjacent pairs of concentric floating gears each in ring form with front and back faces, each having a row of teeth thereon, each pair of floating gears comprising a ring of smaller diameter fitting within a ring of large diameter, the floating gears being interposed between the wobble gear and the anchor and terminal gears and having retaining means for substantially fixing the radial position while providing freedom of motion with respect to rotation and tilting, each row of teeth of the wobble gear being arranged to mesh with the row of teeth on the back face of one of the floating gears, the teeth of the anchor gear and the teeth of the terminal gear each being arranged to mesh with the teeth on the front face of one of the floating gears, each of the remaining floating gear teeth being arranged to mesh with teeth of an adjacent floating gear.

5. A speed reducer comprising the combination of an anchor gear with a row of teeth thereon, a rotatable terminal gear of different diameter from the anchor gear with a row of teeth thereon and so mounted that the rows of teeth of the two gears face in substantially the same direction and one row lies substantially within the other row, a wobble gear mounted with an axis capable of tilting and with first and second concentric rows of teeth thereon facing toward the teeth of the anchor gear and the terminal gear, and paired concentric floating gear means each in ring form with opposite faces having rows of teeth thereon, the floating gear means being interposed between the wobble gear and the anchor and terminals gears, and having retaining means for substantially fixing the radial position providing freedom of motion with respect to rotation and tilting, each row of teeth of the wobble gear being arranged to mesh with the row of teeth on one of the faces of floating gear means and the teeth of the anchor gear and the teeth of the terminal gear each being arranged to mesh with the teeth on one of the opposite faces of the floating gear means.

6. A speed reducer comprising in combination an anchor gear, floating gear means mounted for motion relative to said anchor gear in nutating engagement therewith, wobble gear means mounted for motion relative to said floating gear means in nutating engagement therewith, means for effecting nutation of the wobble gear means to cause said wobble gear means and said floating gear means to nutate together, and output means rotatably mounted relative to said anchor gear and connected to said wobble gear means for providing a rotational output which is a function of the rotation of said wobble gear means and said floating gear means, said floating gear means having a plurality of teeth different in number from the number of the corresponding teeth of at least one of said other gears.

7. A gear train comprising in combination a first gear, a pair of interconnecting gear means suspended relative each other and said first gear for nutating with respect thereto, one of said pair of gear means having a plurality of teeth different in number from the number of the corresponding teeth of at least one of said other gears, means for effecting nutation of said pair of gear means, and means for providing a rotational output which is a function of the rotation of said pair of gear means relative to said first gear.

8. A speed reducer comprising in combination an anchor gear with a row of teeth thereon, a floating gear having opposite faces with first and second rows of teeth thereon, the first row of teeth being arranged to mesh with the anchor gear, a wobble gear mounted with an axis capable of tilting and with first and second concentric rows of teeth thereon, the first row being arranged to mesh with the second row of teeth of the floating gear, mechanism for effecting nutation of the wobble gear, a second floating gear having opposite faces with first and second rows of teeth thereon, the first row of teeth of the second floating gear being arranged to mesh with the second row of teeth of the wobble gear, a terminal gear having teeth arranged to mesh with the second row of teeth of the second floating gear, one of the rows of teeth of the wobble gear differing by a relatively small number from the number of teeth of the gear meshing therewith, the floating gears constituting rings of different diameter with toothed faces, the wobble gear having a spherical segment secured thereto and radially spacing the floating gears and radially retaining them with freedom of tilting and rotating motion, and the wobble gear being formed with a surface constituting a relatively flat truncated cone, and a spherical segment secured against transverse movement having a radius fitting within said truncated cone shaped wobble gear and within the smaller diameter floating gear for retaining the wobble gear radially while permitting it freedom of motion with respect to tilting and rotation and retaining the smaller diameter wobble gear radially with freedom of motion with respect to tilting and rotation.

9. In a wobble-gear-type speed reducer, in combination with a wobble gear, mechanism for causing nutation thereof comprising a plurality of plungers, solenoid windings arranged with axes parallel and spaced along the periphery of a circle for actuating the plungers, each plunger having a tip adapted to bear against the face of the wobble gear upon a stroke of the plunger, and means for successively energizing the solenoids so that successive plungers bear against successive portions of the face of the wobble gear.

10. A wobble gear nutating mechanism as in claim 9 wherein a commutator is provided for energizing solenoids one at a time in succession.

11. A wobble gear nutating mechanism as in claim 9 wherein a commutator is provided with spaced conducting segments for energizing pairs of alternate solenoid windings in succession to promote stability.

12. A wobble gear nutating mechanism as in claim 9 wherein terminals for energization by polyphase current are provided, a neutral terminal is provided and each of the windings is connected between the neutral terminal and one of the polyphase terminals through rectifier means.

13. A wobble gear nutation mechanism as in claim 9 wherein a plurality of terminals are provided for energization by a source of polyphase current, the terminals constituting half the number of solenoid windings, a common terminal for connection to all of the solenoid windings, each of the polyphase terminals being connected to two of the solenoid windings, half of the solenoid winding connections including a rectifier arranged with one polarity with respect to the common terminal and the other half including a rectifier arranged with the opposite polarity with respect to the common terminal whereby the solenoids are successively energized.

14. In a wobble gear type speed reducer, in combination with a wobble gear in the form of a ring having opposite faces with rows of teeth on one face, the other face being relatively smooth, a rotatably mounted, spherical-surface guide for radially retaining the wobble gear with freedom of motion with respect to rotation and tilting, and a shoe mounted on said spherical surface guide for pressing axially against the smooth face of the wobble gear at successively different peripheral portions thereof.

15. The combination recited in claim 1 wherein said mechanism for effecting a nutation of the wobble gear comprises a plurality of plungers, a plurality of solenoid windings for actuating said plungers, said plungers arranged along the periphery of said wobble gear and adapted to actuate said wobble gear upon a stroke of each plunger, and means for successively energizing said solenoids so that successive plungers bear against successive portions of the wobble gear.

16. The combination recited in claim 8 wherein said mechanism for effecting nutation of the wobble gear comprises a plurality of plungers, a plurality of solenoid windings, each adapted to actuate a respective plunger, said plunger being spaced circularly around said wobble gear and adapted to cause said wobble gear to wobble upon the stroke of the plunger, and means for energizing said solenoids.

References Cited in the file of this patent

UNITED STATES PATENTS

| Re. 22,549 | Plenser | Sept. 26, 1944 |
| 526,413 | Rushton | Sept. 25, 1894 |
| 959,394 | Salomo | May 24, 1910 |
| 1,144,807 | Bronner et al. | June 29, 1915 |
| 1,144,808 | Bronner et al. | June 29, 1915 |
| 1,495,784 | Freday | May 27, 1924 |
| 1,616,369 | Hartman | Feb. 1, 1927 |
| 2,830,458 | Sundt | Apr. 15, 1958 |